United States Patent
Chen

(10) Patent No.: US 7,825,349 B2
(45) Date of Patent: Nov. 2, 2010

(54) LASER SYSTEM AND METHOD FOR PATTERNING MOLD INSERTS

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1037 days.

(21) Appl. No.: 11/309,343

(22) Filed: Jul. 28, 2006

(65) Prior Publication Data

US 2007/0104234 A1    May 10, 2007

(30) Foreign Application Priority Data

Nov. 10, 2005    (CN) .................... 2005 1 0101190

(51) Int. Cl.
*B23K 26/00* (2006.01)
(52) U.S. Cl. ................. 219/121.68; 219/121.69; 219/121.83
(58) Field of Classification Search ........... 219/121.68, 219/121.69, 121.83, 121.67, 121.72
See application file for complete search history.

(56) References Cited

U.S. PATENT DOCUMENTS

| | | | | |
|---|---|---|---|---|
| 3,817,604 A | * | 6/1974 | Watt | 359/748 |
| 3,947,093 A | * | 3/1976 | Goshima et al. | 359/716 |
| 5,038,016 A | | 8/1991 | Robertson et al. | |
| 5,065,330 A | * | 11/1991 | Karube et al. | 700/166 |
| 5,281,798 A | * | 1/1994 | Hamm et al. | 250/205 |
| 5,348,616 A | * | 9/1994 | Hartman et al. | 216/48 |
| 5,358,604 A | * | 10/1994 | Lin et al. | 216/17 |
| 5,360,960 A | * | 11/1994 | Shirk | 219/121.83 |
| 5,430,475 A | * | 7/1995 | Goto et al. | 348/65 |
| 5,601,737 A | * | 2/1997 | Asahi et al. | 219/121.66 |
| 5,690,845 A | * | 11/1997 | Fuse | 219/121.74 |
| 5,707,578 A | * | 1/1998 | Johnson et al. | 264/401 |
| 5,792,411 A | * | 8/1998 | Morris et al. | 264/400 |
| 5,891,351 A | * | 4/1999 | Lee et al. | 216/74 |
| 5,945,197 A | * | 8/1999 | Xuan et al. | 428/141 |
| 5,968,608 A | * | 10/1999 | Xuan et al. | 427/555 |
| 6,175,096 B1 | * | 1/2001 | Nielsen | 219/121.72 |
| 6,667,456 B2 | | 12/2003 | Mukasa et al. | |
| 6,752,952 B2 | * | 6/2004 | Davis | 264/293 |
| 2004/0032667 A1 | * | 2/2004 | Gale et al. | 359/642 |
| 2005/0109742 A1 | * | 5/2005 | Nagai et al. | 219/121.73 |

FOREIGN PATENT DOCUMENTS

JP    1210184 A    8/1989

* cited by examiner

*Primary Examiner*—M. Alexandra Elve
(74) *Attorney, Agent, or Firm*—Jeffrey T. Knapp

(57) ABSTRACT

A laser system (99) for patterning a mold insert includes a laser source module (10), a feedback module (20), and a controlling module (30). The laser source module includes a laser source (11) for emitting laser beams, and a lens module (10) with a changeable focal length configured for focusing the laser beams on the surface of the mold insert. The feedback module (20) is configured for receiving the laser beams reflected from the surface of the mold insert and generating a corresponding feedback signal according to the received laser beams. The controlling module is configured for receiving the feedback signal from the feedback module thereby controlling the laser source according to the feedback signal. A method for manufacturing the mold insert is also provided.

2 Claims, 2 Drawing Sheets

LASER SYSTEM AND METHOD FOR PATTERNING MOLD INSERTS

CROSS-REFERENCE TO RELATED APPLICATIONS

This application is related to commonly-assigned copending applications entitled, "APPARATUS FOR PROCESSING WORK-PIECE", filed Jul. 31, 2006 Ser. No. 11/309,353, and "LASER WELDING SYSTEM FOR WELDING WORKPIECE", filed on Jun. 23, 2006 (U.S. application Ser. No. 11/473965). Disclosures of the above identified applications are incorporated herein by reference.

1. Field of the Invention

The present invention generally relates to laser systems and methods for patterning molds. Specifically, the present invention relates to a laser system for patterning a mold insert and a method for patterning the mold insert.

2. Description of Related Art

Optical elements, such as optical lenses, are widely used in cameras, projectors, disc readers and lenses for mobile phones. With a rapid development of need for the optical elements, high quality optical elements are increasingly greater demand. Therefore, technologies for manufacturing optical elements have been developed. Nowadays, technologies for manufacturing optical elements mainly include press-molding, milling and injection-molding processes etc.

In an injection-molding process, molds are used. An important part of the mold is the mold insert, as the profile of the mold insert determines a profile of the product. A conventional laser device for patterning a mold insert includes: a laser source, a blocking shutter and a lens. The laser source emits laser beams for patterning surfaces of the mold insert. The blocking shutter is used for controlling an intensity of the laser beams. The lens is used for focusing the laser beams passing through the blocking shutter on the surfaces of the mold insert so as to pattern the surfaces of the mold insert. A mold product is provided after patterning the surfaces of the mold insert. However, it is hard to focus the laser beams accurately on the surfaces of the mold insert by the single lens because a focal length of the single lens is unchangeable. Also required patterning parameters of the laser beams, such as pulse energy, pulse duration and repetition rate, can not be controlled accurately because the laser source is controlled by the conventional laser device according to original received parameters so that the mold insert produced is not sufficiently smooth.

What is needed, therefore, is a laser system for patterning a mold insert with good focusing of laser beams and controlling of required patterning parameters.

SUMMARY OF THE INVENTION

In one preferred embodiment, a laser system for patterning a mold insert includes a laser source module, a feedback module, and a controlling module. The laser source module includes a laser source for emitting laser beams, and a lens module with a changeable focal length configured for focusing the laser beams on the surface of the mold insert. The feedback module is configured for receiving the laser beams reflected from the surface of the mold insert and generating a corresponding feedback signal according to the received laser beams. The controlling module is configured for receiving the feedback signal from the feedback module thereby controlling the laser source according to the feedback signal.

In another preferred embodiment, a method for patterning the mold insert includes the steps of:

providing a laser system, the laser system comprising a laser source module for emitting laser beams, a feedback module and a controlling module, the laser source module comprising a lens assembly with a changeable focal length configured for focusing the laser beams on a surface of the mold insert;

transmitting a controlling signal generated by the controlling module to the laser source module;

emitting the laser beams from the laser source module according to the controlling signal;

focusing the laser beams onto the surface of the mold insert using the lens module; receiving the laser beams reflected from the surface of the mold insert, and generating a feedback signal according to the reflected laser beams to the controlling module using the feedback module; and adjustably controlling the laser source module to emit the laser beams according to the feedback signal using the controlling module.

Advantages and novel features will become more apparent from the following detailed description of the present laser system and patterning method, when taken in conjunction with the accompanying drawings.

BRIEF DESCRIPTION OF THE DRAWINGS

Many aspects of the present laser system and patterning method can be better understood with reference to the following drawings. The components in the drawings are not necessarily drawn to scale, the emphasis instead being placed upon clearly illustrating the principles of the present laser system and patterning method. Moreover, in the drawings, like reference numerals designate corresponding parts throughout the several views.

Figure 1:
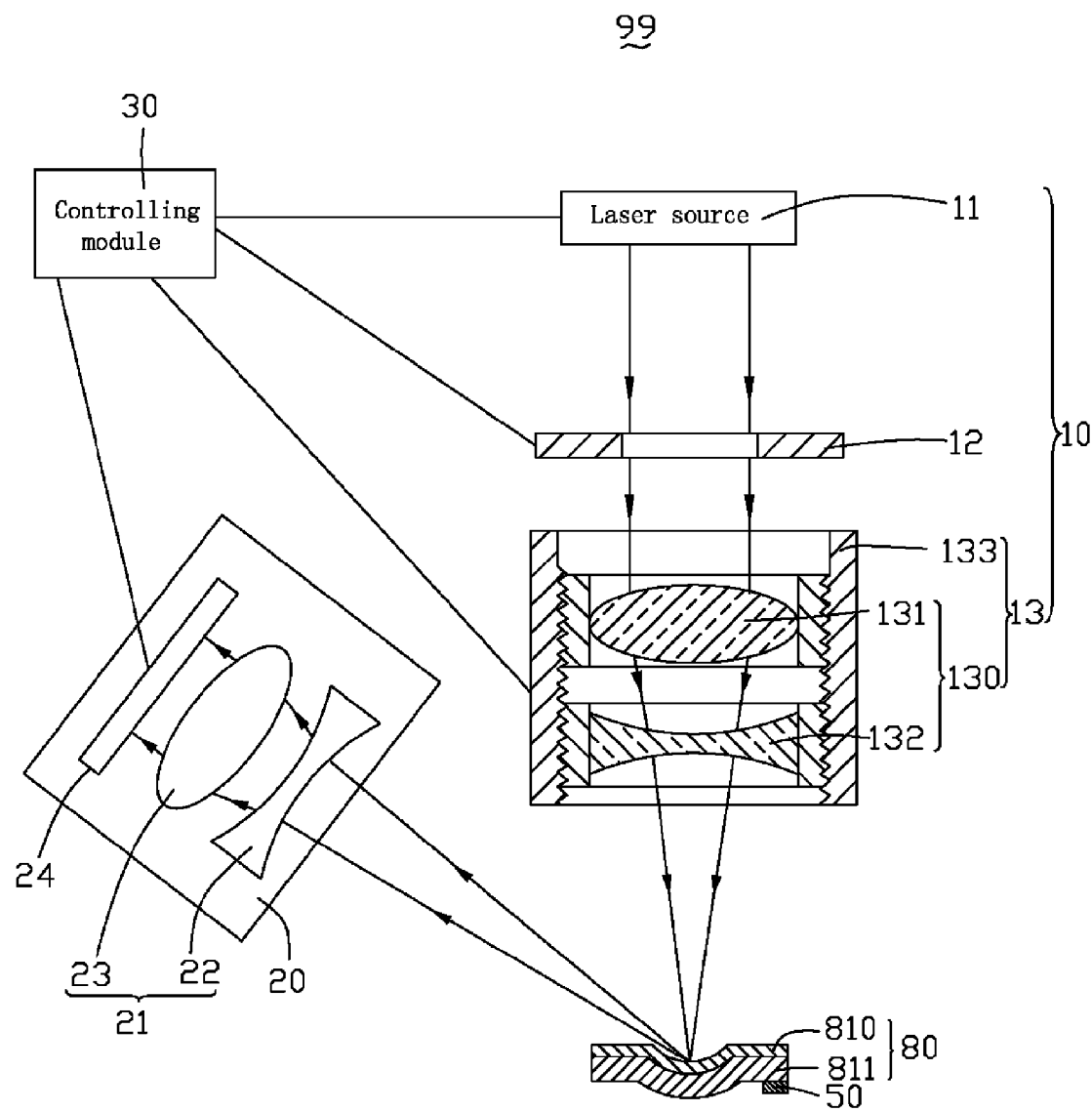
FIG. 1 is a schematic view of a laser system in accordance with a first preferred embodiment.

Corresponding reference characters indicate corresponding parts throughout the drawings. The exemplifications set out herein illustrate at least one preferred embodiment of the present laser system and patterning method, in one form, and such exemplifications are not to be construed as limiting the scope of the invention in any manner.

DETAILED DESCRIPTION OF THE INVENTION

Reference will now be made to the drawings to describe preferred embodiments of the present laser system and patterning method, in detail.

Referring to FIGS. 1, a laser system 99 in accordance with a first preferred embodiment, is shown. The laser system 99 is used for patterning for example a mold insert 80 for forming a mold product. The laser system 99 includes a laser source module 10, a feedback module 20, and a controlling module 30. The laser system 99 may further include a cooling unit 50.

The laser source module 10 includes a laser source 11, an blocking shutter 12 and a lens module 13. The lens module 13 includes a lens barrel 133 and a first lens assembly 130 contained in the lens barrel 133. The lens module 13 has a changeable focal length so as to focus the laser beams on a surface of the mold insert 80. The laser source 11 emits laser beams towards the surface of the mold insert 80. In this preferred embodiment, the laser source 11 is a neodymium-doped yttrium-aluminium garnet (Nd:YAG) laser source for emitting laser beams with a wavelength of about 532 nanometers. Alternatively, the laser source 11 can be a neodymium-doped yttrium orthovanadate (Nd:YVO4) laser source for emitting laser beams with a wavelength of about 532 nanometers.

The laser beams emitted from the laser source 11 are transmitted to the blocking shutter 12. The blocking shutter 12 is configured for regulating an intensity of the laser beams according to the controlling module 30. For example, if the blocking shutter 12 is completely opened, the laser beams completely pass through the blocking shutter. In this case, the intensity of the laser beams is maximum. If the blocking shutter 12 is completely closed, the laser beams can not pass through the blocking shutter 12. In this case, the intensity of the laser beams is minimum.

The first lens assembly 130 includes a first convex lens 131 and a first concave lens 132. The first convex lens 131 and the first concave lens 132 are positioned coaxial with each other in that order along a transmission direction of the laser beams. The lens barrel 133 changes a relative position of the first convex lens 131 and the first concave lens 132 according to the controlling module 30 so as to change a focal length of the first lens assembly 130. According to Gauss' formula:

$$1/p + 1/q = 1/f, \quad (1)$$

wherein, p indicates object distance, and q indicates image distance, and f indicates focal length of the first lens assembly 130. In formula (1), if object distance p is constant, image distance q is changed by changing focal length f. Therefore, focal length f of the first lens assembly 130 is changed by changing the relative position of the first convex lens 131 and the first concave lens 132 so as to focus the laser beams accurately on the surface of the mold insert 80.

The mold insert 80 includes a stainless steel layer 811 as a substrate and a nickel phosphide (NiP) layer 810 formed on the substrate 811. The laser beams are focused on the NiP layer 810 of the mold insert 80 by the first lens assembly 130 and treat the NiP layer 810 in a manner so as to form a desired pattern. Meanwhile, the laser beams are reflected partially from the surface of the mold insert 80 to form reference laser beams. An intensity of the reference laser beams may indicate a condition of the patterned surface of the mold insert.

The feedback module 20 is configured for receiving the reference laser beams as an optical signal and transforms the optical signal into a corresponding electronic feedback signal. The feedback signal generally contains information about the condition of the patterned surface of the mold insert. The feedback module 20 includes a second lens assembly 21 and an optical detector 24. The second lens assembly 21 includes a second concave lens 22 and a second convex lens 23 positioned coaxial with each other in that order along a transmission direction of the reference laser beams. The second concave lens 22 diverges the reference laser beams and the convex lens 23 converges the diverged reference laser beams to project onto the optical detector 24. The optical detector 24 receives the reference laser beams as the optical signal and then transforms the optical signal into the feedback signal and transmits the feedback signal to the controlling module 30.

The controlling module 30 receives the feedback signal, and further confirms and optimizes the patterning parameters, such as pulse energy, pulse duration, and repetition of the laser beams emitted from the laser source 11 according to the feedback signal, and generates a first feedback signal, a second feedback signal and a third feedback signal. The first controlling signal is transmitted to the laser source 11, and the second controlling signal is transmitted to the blocking shutter 12 for controlling the blocking shutter 12, and the third signal is transmitted to the lens barrel 133 for controlling the lens barrel 133. A working flow of the laser system 99 is described as follows.

Firstly, the controlling module 30 receives required patterning parameters of the mold insert and generates a first controlling signal, a second controlling signal and a third controlling signal correspondingly, and transmits the controlling signals to the laser source 11, the blocking shutter 12 and the lens module 13. Secondly, the laser source 11 emits laser beams according to the first controlling signal. The blocking shutter 12 adjusts the intensity of the laser beams according to the second controlling signal. The lens module 13 changes a focal length of the first lens assembly 130 using the lens barrel 133 according to the third controlling signal. The laser beams are then focused on the surface of the mold insert 80 to treat the surface of the mold insert 80. Meanwhile, the laser beams are partially reflected from the surface of the mold insert 80 to form the reference laser beams. Finally, the feedback module 20 receives the reference laser beams as an optical signal and transforms the optical signal into the feedback signal and further transmits the feedback signal to the controlling module. The controlling module 30 confirms and optimizes the patterning parameters of the laser beams according to the feedback signal. A mold product is provided by patterning the surface of the mold insert 80 through the above-mentioned working flow.

In this preferred embodiment, the lens module 13 including the first convex lens 131 and the first concave lens 132 is used in the laser system 99 and the laser beams are focused accurately on the surface of the mold insert by the first lens assembly 130. Moreover, the feedback module 20 and the controlling module 30 are used for further confirming and optimizing the patterning parameters of the laser beams so that a smoothness of the mold insert is enhanced.

Figure 2:
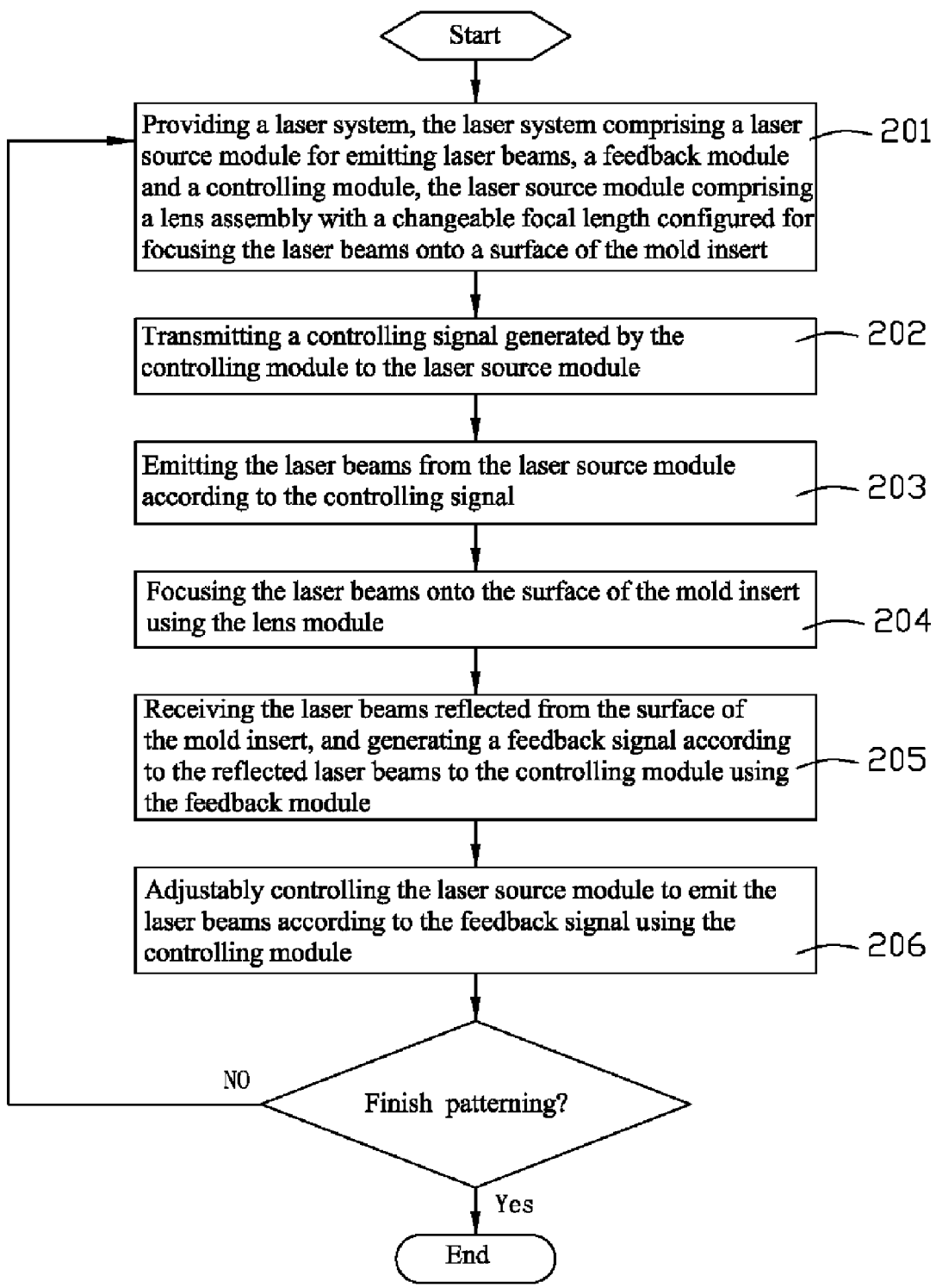
FIG. 2 is schematic flow chart of a method for patterning a mold insert in accordance with a second preferred embodiment.

Referring to FIG. 2, a flow chart of a method for patterning a mold insert in accordance with a second preferred embodiment is shown. The method mainly includes the steps of: (201) providing a laser system, the laser system comprising a laser source module for emitting laser beams, a feedback module and a controlling module, the laser source module comprising a lens assembly with a changeable focal length configured for focusing the laser beams on a surface of the mold insert; (202) transmitting a controlling signal generated by the controlling module to the laser source module; (203) emitting the laser beams from the laser source module according to the controlling signal; (204) focusing the laser beams onto the surface of the mold insert using the lens module; (205) receiving the laser beams reflected from the surface of the mold insert, and generating a feedback signal according to the reflected laser beams to the controlling module using the feedback module; and (206) adjustably controlling the laser source module to emit the laser beams according to the feedback signal using the controlling module.

In the step (201), the laser system 99 is similar to the first embodiment.

In the step (202), the controlling module 30 receives required patterning parameters of the mold insert 80 and generates a first controlling signal, a second controlling signal and a third controlling signal, which are transmitted to the laser source 11, the blocking shutter 12 and the lens module 13 of the laser source module 10 respectively.

In the step (203), the laser source 11 emits laser beams according to the first controlling signal, and the laser beams are then transmitted to the blocking shutter 12.

In the step (204), the blocking shutter 12 regulates an intensity of the laser beams according to the second controlling signal. The lens barrel 133 changes a relative position of the first convex lens 131 and the first concave lens 132 of the first lens assembly 130 so as to focus the laser beams accurately onto the surface of the mold insert 80. The surface of the mold insert 80 is thus patterned by the laser beams.

In the step (205), the laser beams are reflected partially from the patterned surface of the mold insert 80 to form reference laser beams, and the reference laser beams are transmitted to the feedback module 20. The second concave lens 22 of the feedback module 20 diverges the reference laser beams and the convex lens 23 of the feedback module 20 converges the diverged reference laser beams to project onto the optical detector 24. The optical detector 24 of the feedback module 20 receives the reference laser beams as an optical signal and then transforms the optical signal into a feedback signal and transmits the feedback signal to the controlling module 30. Meanwhile, heat generated by patterning the mold insert 80 is dissipated by the cooling unit 50 attached to the substrate 811 of the mold insert 80 for cooling the mold insert 80.

In the step (206), the controlling module 30 receives the feedback signal. The controlling module 30 further confirms and optimizes the patterning parameter, such as pulse energy, pulse duration, and repetition of the laser beams according to the feedback signal. If patterning the surface of the mold insert 80 is not finished, steps (201) to step (206) are repeated so as to finish the patterning.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A laser system for patterning a mold insert, the laser system comprising:
    a laser source module comprising a laser source for emitting laser beams, a lens module comprising a lens barrel and a first lens assembly which further comprises a first convex lens and a first concave lens positioned coaxially with each other in the lens barrel, with a changeable focal length configured for focusing the laser beams on the surface of the mold insert, a blocking shutter configured for regulating an intensity of the laser beams, and a cooling unit to cool down the temperature of the mold insert;
    a feedback module, comprising an optical detector and a second lens assembly which further comprises a second concave lens and a second convex lens positioned coaxially with each other, configured for receiving the laser beams reflected from the surface of the mold insert and generating a corresponding feedback signal according to the received laser beams; and
    a controlling module configured for receiving the feedback signal from the feedback module thereby controlling the laser source according to the feedback signal.

2. A method for patterning a mold insert, the method comprising the steps of:
    providing a laser system, the laser system comprising a laser source module for emitting laser beams, a feedback module, comprising an optical detector and a second lens assembly which further comprises a second concave lens and a second convex lens positioned coaxially with each other, a controlling module, a lens module, comprising a lens barrel and a first lens assembly which further comprises a first convex lens and a first concave lens positioned coaxially with each other in the lens barrel, with a changeable focal length configured for focusing the laser beams onto a surface of the mold insert, a blocking shutter configured for regulating an intensity of the laser beams, and a cooling unit to cool down the temperature of the mold insert;
    transmitting a controlling signal generated by the controlling module to the laser source module;
    emitting the laser beams from the laser source module according to the controlling signal;
    focusing the laser beams onto the surface of the mold insert using the lens module;
    receiving the laser beams reflected from the surface of the mold insert, and generating a feedback signal according to the reflected laser beams to the controlling module using the feedback module; and
    controlling adjustably the laser source module to emit the laser beams according to the feedback signal using the controlling module.

* * * * *